United States Patent [19]

Riew et al.

[11] Patent Number: 4,496,692
[45] Date of Patent: Jan. 29, 1985

[54] MOLDING COMPOSITIONS OF POLYVINYL CHLORIDE AND POLYMERIZABLE PLASTICIZERS

[75] Inventors: Changkiu K. Riew; Frank H. Howard, both of Akron, Ohio

[73] Assignee: The B. F. Goodrich Company, Akron, Ohio

[21] Appl. No.: 567,285

[22] Filed: Dec. 30, 1983

[51] Int. Cl.³ .................. C08L 63/02; C08L 27/22
[52] U.S. Cl. ............................ 525/112; 525/121
[58] Field of Search .................. 525/112, 121, 65

[56] References Cited

U.S. PATENT DOCUMENTS 4,087,480 5/1978 Takahashi et al. .................. 525/65

FOREIGN PATENT DOCUMENTS 48-23555 7/1973 Japan .................................. 525/65
54-134757 10/1979 Japan ................................. 525/112

Primary Examiner—Melvyn I. Marquis
Assistant Examiner—Robert E. L. Sellers
Attorney, Agent, or Firm—Carl W. Battle; Alan A. Csontos

[57] ABSTRACT

Improved molding composition comprising (1) polyvinyl chloride, which is blended with a dehydrochlorinating agent such as a stannous salt; (2) a free-radically polymerizable monomer and/or macromer, wherein the monomer contains at least one terminal $CH_2=C<$ group per molecule and the macromer contains at least one double bond in the polymeric backbone; (3) an ionically polymerizable monomer and/or macromer containing the oxirane group

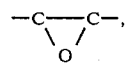

with an optional curing agent; (4) a heterofunctional monomer containing at least one oxirane group and at least one $CH_2=C<$ group per molecule; and (5) a free radical initiator results in an improvement in thermomechanical properties.

6 Claims, No Drawings

MOLDING COMPOSITIONS OF POLYVINYL CHLORIDE AND POLYMERIZABLE PLASTICIZERS

SUMMARY OF THE INVENTION

This invention relates to improved molding compositions and their preparation essentially comprising polyvinyl chloride resin; a dehydrochlorinating agent; one or more free-radically polymerizable monomers and/or macromers, wherein the monomer contains at least one terminal $CH_2=C<$ group per molecule and the macromer contains at least one double bond in the polymeric backbone; one or more ionically polymerizable monomers and/or macromers containing the oxirane group

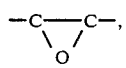

with an optional curing agent; one or more heterofunctional monomers containing at least one oxirane group and at least one $CH_2=C<$ group per molecule; and a free radical initiator. The compositions may optionally contain a functionally terminated reactive liquid polymer for improved toughening, as well as various impact modifiers, fillers, lubricants, fibers, pigments and other ingredients.

The compositions of this invention allow the effective use of polyvinyl chloride as an engineering structural plastic, and, when the compositions are cured, they result in an improvement in thermo-mechanical properties. In preparing the compositions of this invention, it is preferable that the dehydrochlorinating agent be blended with the polyvinyl chloride resin before mixing with the other polymerizable components.

BACKGROUND OF THE INVENTION

The prior art is replete with efforts to modify polymeric materials for optimal use as molding compounds. These efforts are generally directed toward obtaining molded articles having good thermo-mechanical properties such as tensile strength, impact resistance, heat distortion temperature, and flame resistance.

Thermosetting unsaturated polyester resin based molding compounds are well known in the art. These compounds usually consist of an unsaturated polyester resin, an ethylenically unsaturated copolymerizable monomer, inert fillers, reinforcing fibers, and a catalyst. Polyester molding compounds are described in U.S. Pat. Nos. 3,940,350; 3,974,124; 3,227,665; 3,701,748; 3,948,716, and 4,101,604. The U.S. Pat. No. 4,101,604 specifically describes a molding composition containing unsaturated polyester resin, polymerizable monomers, and epihalohydrin polymers used as tougheners. A severe disadvantage with polyester based compositions and articles made therefrom is their relatively low flame resistance properties. It is also well known that thermosetting resins such as polyesters are relatively brittle to fabricate when compared to thermoplastic materials such as polyvinyl chloride.

Because of their ease of fabrication, there has been a greatly increased demand for thermoplastic molding compositions. The most available and one of the least expensive of all general purpose thermoplastics is polyvinyl chloride. Various compositions which contain polyvinyl chloride resins are disclosed in U.S. Pat. Nos. 2,943,952; 3,066,110; 3,700,624; 3,557,046; 3,275,714; and 3,305,514. The U.S. Pat. No. 3,700,624 describes a resinous composition comprising a vinyl chloride resin, an unsaturated polyester resin, an acrylic acid ester plasticizer and a polymerization initiator. The U.S. Pat. No. 3,275,714 describes reinforced plastic compositions composed of a thermoplastic resin, such as polyvinyl chloride; a thermosetting synthetic polymer, such as epoxide resin or an unsaturated alkyl resin; a polymerizable polyalkenyl monomer; a polymerizable monoalkenyl monomer; and a randomly dispersed reinforcing fiber. These compositions are stated to possess the ease of fabrication of thermoplastics combined with the high performance of thermosetting plastics in the end product.

The cured prior art compositions comprising polyvinyl chloride, unsaturated polyester resin or epoxy resin, and polymerizable monomers are basically a fused matrix which has unreacted polyvinyl chloride dispersed therein. Several advantages are obtained from the compositions of the present invention which results in a reactive polyvinyl chloride which is firmly bonded to the polymeric matrix upon curing and forming an interpenetrating polymer network (IPN). The present invention results in a cured composition which is transparent and has a single glass transition temperature as opposed to the multiple glass transition temperatures of the prior art compositions. In addition, the compositions of the present invention result in a significant improvement in thermo-mechanical properties. Further, the present invention results in compositions which possess the ease of fabrication of thermoplastics with the stability and durability of thermosets, and which are flame resistant.

The compositions of this invention find utility in conventional sheet molding, bulk molding, compression molding, and injection or extrusion molding applications. The glass fiber containing compositions are particularly useful in sheet molding and bulk molding operations.

DETAILED DESCRIPTION

This invention involves improved molding compositions and their method of preparation. The compositions of the present invention contain essentially homopolymers or copolymers of polyvinyl chloride; a dehydrochlorinating agent; one or more free-radically polymerizable monomers and/or macromers, wherein the monomer contains at least one terminal $CH_2=C<$ group per molecule and the macromer contains at least one double bond in the polymeric backbone; one or more ionically polymerizable monomers and/or macromers containing the oxirane group

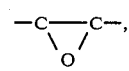

with an optional curing agent; one or more heterofunctional monomers containing at least one oxirane group and at least one $CH_2=C<$ group per molecule; and a free radical initiator.

The polyvinyl chloride resin to be used in the compositions of this invention includes a homopolymer of vinyl chloride or chlorinated polyvinyl chloride, or a copolymer of vinyl chloride with other monomers copolymerizable therewith. The copolymers include those of vinyl chloride with vinyl acetate, vinyl propionate, ethyl acrylate, butyl acrylate, methyl methacrylate, vinylidene chloride, acrylonitrile, vinyl ether, diethyl maleate, acrylic acid, methacrylic acid, maleic anhydride, and the like.

A bi-modal or multi-modal distribution of particles is desirable for the polyvinyl chloride resin for improved flow properties in the molding composition. The preferred molding composition contains a mixture of coarse polyvinyl chloride particles having an average particle size from about 30 to about 200 microns, and fine polyvinyl chloride particles having an average particle size of from about 0.05 to about 30 microns. The differently sized polyvinyl chloride particles are preferably used in combination in a weight ratio of large to small particle size of from about 1:9 to about 9:1.

It is critical to the practice of the present invention that the polyvinyl chloride be converted to an ethylenically unsaturated form. The unsaturated double bonds in the PVC polymer are necessary to make the PVC polymer reactive with polymerizable monomers and macromers by forming chemical bonds. The unsaturation in the polyvinyl cloride can be introduced by dehydrochlorination in the presence of a catalytic amount of dehydrochlorinating agents such as Group I-A alkali metal salts, such as lithium chloride, lithium stearate, sodium ethylate, sodium isopropylate, potassium sulfate; Group II-A alkaline earth metal salts such as magnesium oxide and magnesium hydroxide; Group III-A post-transition metal salts, such as aluminum oxide; Group IV-A transition metal salts such as tin (II) sulfate, tin oxides, and tin (II) 2-ethyl hexanoate; Group V-A post-transition metal salts such as bismuth oxides; lanthanide metal salts such as cerium oxide and cerium acetyl acetonate; Group I-B transition metal salts, such as cuprous chloride; Group II-B post-transition metal salts, such as $ZnO$, $Zn_2SiO_4$, $Zn_2B_6O_{11}$, $Zn_3(PO_4)_2$, zinc stearate, $CdO$, $CdCl_2$, and cadmium stearate; Group IV-B transition metal sats, such as titanium acetyl acetonate, $TiOSO_4$, $TiO_2$, and zirconium acetyl acetonate; Group V-B transition metal salts, such as vanadium acetyl acetonate, $V_2O_5$, $VOSO_4$, and $Nb_2O_5$; Group VI-B transition metal salts, such as chromium acetyl acetonate, $CrCl_3$, $(NH_4)Mo_8O_{26}$, $CaMoO_4$, $SrMoO_4$, $ZnMoO_4$, $MoO_3$, $H_2WO_4$, and $WO_3$; Group VII-B transition metal salts, such as $MnO_3$ and $MnCO_3$; and Group VIII-B transition metal salts, such as $Fe_2(SO_4)_3$, $FeSO_4$, $Fe_2O_3$, $Co_2O_3$, $CoCO_3$, $CoCl_2$, cobalt stearate, $Ni_2O_4$, $NiO$ and the like.

Stannous salts are excellent in-situ dehydrochlorinating agents to generate unsaturation in the backbone of polyvinyl chloride molecules. Suitable stannous salts for the practice of this invention are those selected from the group consisting of stannous sulfate, stannous oxide, stannous naphthenate and stannous salts of aliphatic monocarboxylic acids containing from 6 to 18 carbon atoms. The acceptable concentration of stannous salts is from about 1 to about 20 parts by weight per 100 parts by weight vinyl resin. The preferred stannous salt for use in this invention is Tin (II) 2-ethylhexanoate. In preparing the compositions of the present invention it is preferable that the stannous salt be blended with the polyvinyl chloride resin before mixing with the other polymerizable components.

The compositions of this invention contain one or more free-radically polymerizable monomers and/or macromers. The polymerizable monomer must contain at least one $CH_2=C<$ group per molecule. The polymerizable monomer acts as a plasticizer and diluent and also copolymerizes with the remaining unsaturated components. Examples of suitable polymerizable monomers are styrene and its derivatives; acrylates such as ethyl acrylate, butyl acrylate, methyl ethacrylate, trimethylolpropane triacrylate; and other similar monomeric materials known to those in the art. The macromers which are suitable for this invention contain at least one double bond in the polymeric backbone, such as, for example, unsaturated polyester resin and the like.

Polyesters useful in this invention are well known in the art and include those derived by condensation of unsaturated dibasic acids or anhydrides containing 4 to 9 carbon atoms with polyols, including dihydroxy and trihydroxy compounds, containing 2 to 12 carbon atoms. The polyester may include in the polymeric chain varying proportions of other saturated or aromatic dibasic acids and anhydrides which are not subject to cross-linking. As the unsaturated dibasic acid there may be exemplified maleic acid, maleic anhydride, and fumaric acid. Aromatic and saturated acids and anhydrides which are exemplary of non-cross-linking moieties within the copolymer include phthalic anhydride, isophthalic acid, tetra-chlorophthalic acid, adipic acid, sebacic acid, succinic acid, and the like. Examples of polyols which can be used for condensation with the diacids include ethylene glycol, diethylene glycol, propylene glycol, glycerol, 1,3-butanediol, trimethylolpropane, and the like. The method by which the unsaturated polyester resins are made is not critical to this invention. Unsaturated polyester resin is commercially available in liquid form containing about 30–50% styrene.

The present invention contains one or more ionically polymerizable monomers and/or macromers containing the epoxy or oxirane group

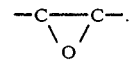

This epoxy component serves both as a compatibilizer between the polyvinyl chloride and macromers such as the polyester resin, and as an effective thermal stabilizer for the polyvinyl chloride. The epoxy materials embodied in this invention are well known in the art. Examples of suitable epoxies include the epoxy ethers of diphenols such as the diglycidyl ether of bisphenol A, epoxy esters of dicarboxylic acids such as diglycidyl adipate, and epoxy derivatives of dienes such as butadiene dioxide or vinyl cyclohexene dioxide. Many other suitable epoxies are disclosed in various publications, such as the "Handbook of Epoxy Resins" by Lee and Neville, McGraw-Hill, New York, 1967. Suitable curing agents known in the art, such as anhydrides, amines, amides, and carboxylic acids, may be used in conjunction with the epoxy. The preferred curing agents for the epoxy are anhydrides such as maleic anhydride, succinic anhydride, phthalic anhydride, methyl tetrahydrophthalic anhydride and the like.

The compositions of this invention contain one or more heterofunctional monomers containing at least one oxirane group and at least one $CH_2=C<$ group per molecule. The heterofunctional monomer combines the versatility of a free-radically polymerizable double bond with an ionically reactive epoxide. The heterofunctional monomer facilitates the formation of an interpenetrating polymer network, in which all polymers are firmly bonded together in the cured compositions. Suitable heterofunctional monomers for use in the practice of this invention include, for example, allyl glycidyl ether, butadiene mono-oxide, limonene oxide, glycidyl acrylates and the like. The preferred heterofunctional monomers are the glycidyl acrylates, and most preferably glycidyl methacrylate.

Examples of suitable free-radical initiators for this invention include benzoyl peroxide, t-butyl peroxide, cyclohexanone peroxide, t-butyl peroctoate, t-butyl perbenzoate, cumene hydroperoxide and the like.

The compositions of this invention may optionally contain a functionally terminated reactive liquid polymer for improved toughness, as well as various impact modifiers, fillers, fibers, pigments and other ingredients. Suitable functionally terminated elastomers include those having hydroxyl, mercapto, or carboxyl groups as described in U.S. Pat. Nos. 4,101,604; 4,221,889; and 3,910,992. Glass reinforcing fibers may be present in these compositions as chipped fibers of about 0.1 to about 3 inches in length, or as woven or non-woven mats or fabrics.

In the preferred embodiment of this invention the compositions are prepared by first mixing the polyvinyl chloride resin with a stannous salt, followed by blending in the remaining ingredients. Low shear mixing is preferred to retain particle sizes and size distribution of PVC and to aid in flow properties of the molding composition. Low shear mixing of the PVC and other dry ingredients results in a low viscosity molding composition upon blending with the remaining liquid components. The preferred composition contains about 100 parts by weight polyvinyl chloride and unsaturated polyester resin, respectively; from about 25 to about 75 parts by weight styrene or its derivatives; from about 5 to about 100 parts, most preferably about 10 to about 50 parts, by weight epoxy resin; from about 1 to about 20 parts, most preferably about 1 to about 10 parts, by weight stannous salt, from about 5 to about 100 parts, most preferably about 10 to about 50 parts, by weight glycidyl methacrylate; from about 5 to about 100 parts, most preferably about 10 to about 50, by weight methyl tetrahydrophthalic anhydride curing agent; and from about 1 to about 5 parts by weight peroxide initiator.

The following Examples are presented to illustrate this invention. All parts, percentages, and proportions of ingredients referred to in the Examples and in the appended claims are by weight unless otherwise indicated.

EXAMPLE I

Blend of Stannous Salt in PVC Resin

In this Example, compositions within the scope of this invention were prepared by low shear blending of Batch A, Batch B, and t-butyl perbenzoate initiator. Batch A and Batch B were prepared using the following recipe:

| Ingredient | Parts by Weight |
|---|---|
| Batch A | |
| Polyvinyl chloride resin (bimodal particle size distribution) | 100 |
| Tin (II) 2-ethylhexanoate | 2 |
| Calcium stearate | 3 |
| Zinc stearate | 1 |
| Batch B | |
| Unsaturated polyester resin | 100 |
| Styrene | 50 |
| Diglycidyl ether of Bisphenol A (DGEBA) | 25 |
| Glycidyl methacrylate (GMA) | 25 |
| Trimethylolpropane triacrylate (TMPTA) | 25 |
| Methyl tetrahydrophthalic anhydride (MTHPA) | 25 |

EXAMPLE II

Blend of Stannous Salt in Polyester Resin

In this Example, compositions within the scope of this invention were prepared by low shear blending of Batch C, Batch D, and t-butyl perbenzoate. Batch C and Batch D were prepared using the following recipe:

| Ingredient | Parts by Weight |
|---|---|
| Batch C | |
| Polyvinyl chloride resin (bimodal particle size distribution) | 100 |
| Calcium stearate | 3 |
| Zinc stearate | 1 |
| Batch D | |
| Unsaturated polyester resin | 100 |
| Styrene | 50 |
| DGEBA | 25 |
| GMA | 25 |
| TMPTA | 25 |
| MTHPA | 25 |
| Tin (II) 2-ethylhexanoate | 4 |

EXAMPLE III

Blend Without Stannous Salt

In this Example, compositions outside the scope of this invention were prepared by low shear mixing of Batch E, Batch F, and t-butyl perbenzoate. Batch E and Batch F were prepared using the following recipe:

| Ingredient | Parts by Weight |
|---|---|
| Batch E | |
| Polyvinyl chloride resin (bimodal particle size distribution) | 100 |
| Calcium stearate | 3 |
| Zinc stearate | 1 |
| Batch F | |
| Unsaturated polyester resin | 100 |
| Styrene | 16.7 |
| DGEBA | 16.7 |
| TMPTA | 16.7 |
| MTHPA | 16.7 |

The compositions prepared in Examples I–III above were mixed by low shear with various amounts of ¼ inch chopped glass fiber strands and compression molded at about 150° C. into sheets having dimensions of about 12"×12"×¼". These sheets were then measured for several thermo-mechanical properties which are presented in Table I.

TABLE I

| Ingredients (Parts by Weight) | I | | | | II | | | III | | | |
|---|---|---|---|---|---|---|---|---|---|---|---|
| Batch A | 40 | 35 | 30 | 25 | — | — | — | — | — | — | — |
| Batch B | 40 | 35 | 30 | 25 | — | — | — | — | — | — | — |
| Batch C | — | — | — | — | 40 | 35 | 30 | — | — | — | — |
| Batch D | — | — | — | — | 40 | 35 | 30 | — | — | — | — |
| Batch E | — | — | — | — | — | — | — | 40 | 35 | 30 | 25 |
| Batch F | — | — | — | — | — | — | — | 40 | 35 | 30 | 25 |
| Glass Fiber | 20 | 30 | 40 | 50 | 20 | 30 | 40 | 20 | 30 | 40 | 50 |
| t-butyl perbenzoate | 0.4 | 0.35 | 0.3 | 0.25 | 0.4 | 0.35 | 0.3 | 0.4 | 0.35 | 0.3 | 0.25 |
| Thermo-Mechanical Properties | | | | | | | | | | | |
| Stress (MPa) | 70.3 | 97.0 | 122.2 | 128.9 | 60.7 | 83.8 | 87.8 | 53.8 | 69.5 | 84.2 | 91.9 |
| Strain (%) | 1.4 | 1.7 | 1.6 | 1.6 | 1.6 | 1.5 | 1.6 | 1.17 | 1.24 | 1.24 | 1.20 |
| Modulus (GPa) | 5.5 | 8.0 | 8.5 | 10.4 | 4.62 | 6.29 | 6.66 | 5.91 | 7.20 | 8.79 | 10.2 |
| IZOD Impact Resistance (J/cm) | 1.33 | 2.09 | 3.32 | 3.32 | 1.95 | 2.66 | 3.31 | 0.47 | 1.92 | 2.00 | 2.18 |
| Heat Distort. Temp. (°C.) | 76 | 76 | 84 | 93 | 61 | 76 | 66 | 63 | 67 | 81 | 86 |

The results in Table I show a significant improvement in heat distortion temperature for compositions within the scope of the present invention, where a stannous salt is initially blended with the polyvinyl chloride resin. The compositions of this invention as illustrated by Examples I and II also exhibit an overall improvement in stress, strain, and impact resistance over compositions without a stannous salt dehydrochlorination agent, and without significant adverse effects on modulus.

We claim:

1. In a molding composition of polymeric materials containing polyvinyl chloride copolymers or homopolymers, free-radically polymerizable plasticizers, and a free radical initiator, the improvement which essentially comprises (1) one or more dehydrochlorinating agents, (2) one or more ionically polymerizable monomers and/or macromers containing the oxirane group

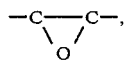

and (3) one or more heterofunctional monomers containing at least one oxirane group and at least one $CH_2=C<$ group per molecule.

2. A composition of claim 1 wherein the dehydrochlorinating agent is a stannous salt.

3. A composition of claim 1 wherein the ionically polymerizable monomer is diglycidyl ether of Bisphenol A.

4. A composition of claim 1 wherein the heterofunctional monomer is a glycidyl acrylate.

5. A composition of claim 1 wherein the dehydrochlorinating agent is initially blended with the polyvinyl chloride resin, and prior to mixing with the remaining polymerizable components.

6. In the process for preparation of molding compositions of claim 1, the improvement which comprises (1) initially blending the polyvinyl chloride with a dehydrochlorinating agent and the other solid ingredients by low shear mixing to obtain a polyvinyl chloride composition, and (2) subsequent blending of the polyvinyl chloride composition with the remaining components to obtain a low viscosity molding composition.

* * * * *